3,538,175
HF ALKYATION PROCESS
George L. Hervert, Downers Grove, Ill., assignor to Universal Oil Products Company, Des Plaines, Ill., a corporation of Delaware
No Drawing. Filed Dec. 11, 1968, Ser. No. 783,094
Int. Cl. C07c 3/52
U.S. Cl. 260—671  5 Claims

ABSTRACT OF THE DISCLOSURE

Formation of stable emulsions in a hydrogen fluoride catalyzed alkylation reaction are eliminated by utilizing hydrogen fluoride containing 0.2 to 3.0 weight percent water or by adding an equivalent amount of water to an emulsion, formed when operating with anhydrous hydrogen fluoride. This is particularly adaptable to the alkylation of a $C_9$–$C_{18}$ mono-olefin, in admixture with a $C_9$–$C_{18}$ n-paraffin, with benzene in preparing detergent alkylate.

BACKGROUND OF THE INVENTION

This invention relates to a hydrogen fluoride alkylation process, particularly a process for producing straight chain alkylaromatics. More specifically, this invention relates to a method of eliminating the formation of stable emulsions and a method for separating a stable emulsion if one is formed, during a hydrogen fluoride catalyzed alkylation reaction.

Processes for the production of straight chain alkylaromatics have gained considerable importance in the past few years as a result of the public's demand for pollution control and clean waters. These straight chain alkylaromatics are characterized in having an aromatic nucleus attached to a $C_9$–$C_{18}$ linear alkyl group in varying positions along the alkyl chain. When these compounds are converted to detergents via sulfonation, neutralization, etc., they are more likely to be biodegradable than detergents of the same chemical composition but in which the isomeric alkyl chain is more highly branched such as those derived from propylene tetramer.

These biodegradable detergents are generally manufactured by the isolation of $C_9$–$C_{18}$ n-paraffins from hydrocarbon mixtures containing these paraffins such as kerosine by use of distillation techniques, molecular sieves or urea adduction separations and converting these n-paraffins to an olefin-acting compound such as a mono-halogenated paraffin or a mono-olefin. Mono-olefins are also produced by the cracking of saturated paraffin waxes. These resultant olefin-acting compounds are then alkylated, often in the presence of the $C_9$–$C_{18}$ unconverted paraffins since the paraffin is not readily separated from the product olefin-acting compound, with a mono-cyclic aromatic such as benzene with the resultant alkylaromatic being sulfonated and neutralized to form the desired detergent.

Processes for the production of high molecular weight branched paraffins having valuable anti-knock properties suitable for use in high-compression automotive engines and aviation fuels are also of considerable importance to the petroleum refining industry. A convenient source of such high molecular weight branched paraffins is the catalytic alkylation of low boiling isoparaffins such as isobutane with olefins such as propylene, butylenes, amylenes and mixtures thereof.

In these foregoing alkylation reactions, anhydrous hydrogen fluoride is the most often used catalyst. However, since alkylatable hydrocarbons are not appreciably soluble in hydrogen fluoride and since it is important to maintain the reactants and catalyst in intimate contact to avoid undesirable side reactions and incomplete olefin conversions, various agitation and dispersing means such as pumps, impellers, propellers, orifice mixers, nozzle mixers, atomizers, etc. must be used to contact the hydrogen fluoride and hydrocarbons to form a uniform reaction mixture. As a result of these agitation and mixing means, an emulsion forms between the hydrogen fluoride catalyst and the insoluble hydrocarbons. This emulsion must be settled, coalesced and separated into its constituent liquid phases in order to recover the desired alkylated product. This can often be done through the use of settlers, centrifuges, etc. However, the emulsions formed are often very permanent and stable because the agitation needed to effect an efficient reaction creates droplets of a dispersed phase so small that settling or coalescence take place only over long periods of time, often in excess of ten hours. Thus, while the formation of an emulsion within the reaction vessel is desirable because of the benefits imparted to the reaction, this emulsion must be unstable to facilitate the separation of the acid hydrogen fluoride phase and the product hydrocarbon phase. The formation of a stable emulsion is undesirable for at least two reasons. First, it requires excessively large, complicated and expensive separation equipment to resolve the emulsion and, secondly, since the acid catalyst and reactants remain in intimate contact at the end of the desired reaction time, undesired side reactions occur which lessen the quality of the final product. Formation of these emulsions is often controlled in the prior art by the addition of an organic diluent which inhibits the formation of a stable emulsion but which also, since it is a diluent, occupies valuable reactor volume necessitating large reactors to maintain a given conversion.

SUMMARY OF THE INVENTION

It is, therefore, an object of this invention to provide a method for eliminating the formation of a stable emulsion in a hydrogen fluoride alkylation reaction, particularly when alkylating a $C_9$–$C_{18}$ linear mono-olefin, in admixture with a $C_9$–$C_{18}$ n-paraffin, with benzene. Another object of this invention is to provide a hydrogen fluoride catalyzed reaction capable of producing an emulsion to effect the desired reaction within the reactor but which is readily separated in the effluent separator. It is a further object of this invention to provide a method for separating a stable emulsion, should one form, in a hydrogen fluoride catalyzed alkylation reaction.

In an embodiment, this invention provides an improvement in an alkylation process for alkylating an alkylatable compound with an alkylating agent in admixture with hydrogen fluoride catalyst, in which process a stable emulsion between the catalyst, reactants and reaction products is formed, which improvement comprises effecting said alkylation in admixture with a hydrogen fluoride catalyst containing about 0.2 to about 3.0% water by weight, whereby the formation of a stable emulsion is eliminated.

In a more limited embodiment, this invention relates to a process for producing an alkylaromatic containing a $C_9$–$C_{18}$ linear alkyl group which comprises the following steps: first, a $C_9$–$C_{18}$ linear n-paraffin is dehydrogenated to form a $C_9$–$C_{18}$ linear mono-olefin in a dehydrogenation zone, recovering therefrom said mono-olefin in admixture with unreacted n-paraffin; second, said mono-olefin in admixture with unreacted n-paraffin is alkylated with a mono-cyclic aromatic in admixture with hydrogen fluoride catalyst containing about 0.2 to about 3.0% water by weight, to form an alkylbenzene containing a $C_9$–$C_{18}$ linear alkyl group; third, an unstable hydrocarbon-acid emulsion is recovered from said alkylation reactor; fourth, said emulsion is separated into an essentially acid-free hydrocarbon phase and an essentially hydrocarbon-free acid phase in a settling zone maintained at a holding time of less than about one hour; and, fifth, the hydrocarbon phase is separated, recovering therefrom, unalkylated monocyclic aromatic, $C_9$–$C_{18}$ n-paraffins and alkylaromatic product.

In another embodiment, this invention relates to a method for separating a stable emulsion formed during the alkylation of an alkylatable compound with an alkylating agent in admixture with hydrogen fluoride catalyst which comprises adding water to provide from about 0.2 to about 3.0% weight water based on the total hydrogen fluoride in said emulsion.

In summary, a principal advantage of the embodiments of this invention resides in the ability to alkylate an alkylating agent, particularly a $C_9$–$C_{18}$ mono-olefin in admixture with a $C_9$–$C_{18}$ n-paraffin, with an alkylatable compound such as benzene, without forming a stable emulsion. Thus, through utilizing the embodiments of this invention, the need for using prior art organic diluents to avoid stable emulsion formation, or the need for intricate separation techniques to separate stable emulsions is avoided and renders a process more readily operable than heretofore available in the art.

DESCRIPTION OF THE PREFERRED EMBODIMENTS

Examples of compounds which may undergo alkylation according to this invention include isoparaffins such as isobutane, isopentane, etc., normal paraffins such as n-butane, n-pentane, etc., aromatic hydrocarbons such as benzene, toluene, xylene, ethylbenzene, cumene, etc., substituted aromatic compounds such as phenol, thiophenol, resorcinol, quinone, anisole, ethoxybenzene, etc. Alkylating agents contemplated within the scope of this invention include carbohydrates, including aldohexoses and their di-, tri- and polyforms, mono-olefins and polyolefins, alcohols, ethers, esters, alkylhalides, alkyl sulfates and alkyl phosphates. Preferred alkylating agents for the production of motor fuel alkylate via isobutane alkylation are the $C_3$–$C_8$ mono-olefins or mixtures thereof.

Preferred alkylating agents for preparing detergent alkylate are $C_9$–$C_{18}$ monohalogenated n-paraffins and linear $C_9$–$C_{18}$ mono-olefins. Processes for the preparation of these compounds are well known to the art and reference may be had thereto for particular details. Typically, these compounds are prepared from the corresponding n-paraffins obtained from kerosine, the Fischer-Tropsch reaction, hydrogenated ethylene polymerization products, or hydrogenated fatty acids; the n-paraffins being recovered by molecular sieves or urea adduction. The halogenated paraffins are typically produced by halogenating the corresponding paraffin, utilizing an excess of paraffin to minimize the formation of polyhalogenated paraffins. Mono-olefins can be prepared by cracking of waxes, dehydrohalogenation of halogenated paraffins or by the dehydrogenation of the corresponding paraffin.

The preferred method of preparing detergent alkylaromatics in the process of this invention is by first preparing $C_9$–$C_{18}$ mono-olefins by the selective dehydrogenation of $C_9$–$C_{18}$ n-paraffins by contacting the paraffin with a dehydrogenation catalyst having an alkali metal compound thereon and promoted with a metal and metal compounds of the Group VI and VIII of the Periodic Table. Other catalysts suitable for the dehydrogenation of straight chain paraffins to form straight chain mono-olefins comprise refractory spacing agents or carriers selected from the group consisting of activated alumina, magnesia, silica, and diatomaceous earth and minor amounts of metals and/or metallic oxides of elements selected from members of Group IV–B, V–B, and VI–B, Group VIII and Group I–B of the periodic Table and include titanium, zirconium, hafnium, vanadium, tantalum, chromium, molybdenum, tungsten, iron, cobalt, nickel, platinum, palladium, copper, silver and the like, including mixtures of the foregoing. Nonacidic catalysts are desirable since they minimize the amount of isomerization of the n-paraffins or resulting mono-olefins to their branched chain analogs.

Especially preferred are those processes which contact the n-paraffin with a catalytic composite of alkalized alumina, a Group VIII metallic component, and a metallic component of arsenic, antimony, bismuth, and compounds thereof, at dehydrogenating conditions including a temperature of about 400° C. to about 600° C., operating pressures of about 10 p.s.i.g. to about 100 p.s.i.g. a mol ratio of hydrogen to liquid hydrocarbon charge of less than 15:1 and a liquid hourly space velocity above 12.0. Typically, these processes have conversions of paraffin to mono-olefin from about 5% to about 25%, selectivities greater than 90% and produce a mixture of the various isomeric linear olefins. Higher conversions are possible but not practical because of undesired side reactions which result in lower selectivities. The resultant effluent may be stripped of light hydrocarbons and/or aromatic components formed by various side reactions. Because the product olefins are not readily separable from the n-paraffin, particularly when processing a mixture of homologous paraffins, the resultant olefins are thus alkylated in admixture with the n-paraffins since the n-paraffins are readily separable from the resultant alkylaromatic or detergents. The same also applies to alkylation via halogenation of paraffins.

Hydrogen fluoride alkylation conditions are well known to the art and include temperatures of about −20° C. to about 50° C., a molar excess of alkylatable compound to alkylating agent and a molar excess of hydrogen fluoride to alkylating agent. To avoid the formation of a stable emulsion during the reaction, the hydrogen fluoride is to contain about 0.2 to about 3.0% by weight water. Utilization of water within these concentrations yields an emulsion readily separable by conventional means. A hydrocarbon phase containing only dissolved acid and essentially free from any visible entrained HF, and an acid phase containing only dissolved hydrocarbon and essentially free from any visible entrained hydrocarbon results. The amounts of dissolved acid and hydrocarbon are low since HF and hydrocarbon are essentially insoluble in each other. Lower water concentrations are not sufficient to avoid the formation of an emulsion while higher concentrations, although they avoid emulsion formation have deleterious side effects such as an increase in the bromine number of the alkylate, corrosion within the unit and low hydrogen fluoride catalyst activity. The formation of detergent alkylate with a high bromine number is particularly undesirable since an alkylate of high bromine number, when converted to detergents, yields a discolored product.

The following examples illustrate the practice and beneficial import of this invention. In a series of tests, using components in concentrations designed to simulate commercial concentration ranges, the effect of water concentration on emulsion settling time was determined.

EXAMPLE I

A n-paraffin-olefin mixture was prepared by the dehydrogenation of a homologous n-paraffin mixture, the composition of which in weight percent, is presented in Table I, by passing this paraffin mixture in admixture with hydrogen at a 9:1 hydrogen to paraffin mol ratio to a small pilot plant reactor maintained at 875° F. and 30 p.s.i.g. at a paraffin charge rate of 28 LHSV over an arsenic-lithiated platinum catalyst containing 0.75 wt. percent platinum on alumina, 0.47 arsenic to platinum mol ratio and 0.5 wt. percent lithium. The product effluent was cooled and normal gaseous components removed to provide a liquid product containing an olefin-paraffin mixture, the composition of which is presented in Table I.

TABLE I

|  | n-Paraffin feed | Liquid product | |
|---|---|---|---|
|  | Paraffin | Paraffin | Olefin |
| $nC_{10}$ | 0.4 | 0.4 |  |
| $nC_{11}$ | 27.6 | 24.6 | 1.7 |
| $nC_{12}$ | 30.8 | 27.8 | 2.6 |
| $nC_{13}$ | 24.8 | 22.4 | 2.8 |
| $nC_{14}$ | 12.9 | 12.0 | 2.0 |
| $nC_{15}$ | 0.4 | 0.4 |  |
| Total non-normals | 3.1 | 3.3 |  |
| Total olefins |  |  | 9.1 |

In Run A, 28.0 grams of this mixture, 11.5 grams of commercial grade benzene, and 100 grams of commercial hydrogen fluoride containing 99.93 wt. percent HF and .07 wt. percent water were placed in a 270 cc. polyethylene bottle calibrated into 10 equal ¼″ units and yielded a sharp interface at Unit 7 (7/4″). This mixture was then agitated along its longitudinal axis at 240 strokes per minute for 60 seconds at 10° C. The resultant emulsion was then allowed to settle, its settling rate measured by measuring, periodically, the height of the lower portion of the settled hydrocarbon upper phase and the height of the upper portion of the settled acid lower phase. When each of the measurements reach 7 units, the emulsion is completely settled. Runs B, C, D were performed in the same manner as Run A except that water was added to the hydrogen fluoride to provide a 0.20, 0.30 and 0.50 wt. percent water concentration in the HF, respectively. The results obtained are presented in Table II wherein H represents the hydrocarbon height and A represents the acid height.

TABLE II

|  | Run | | | | | | | |
|---|---|---|---|---|---|---|---|---|
|  | A | | B | | C | | D | |
| Percent H₂O | .07 | | .20 | | .30 | | .40 | |
| Percent HF | 99.93 | | 99.80 | | 99.70 | | 99.60 | |
|  | H | A | H | A | H | A | H | A |
| Time (sec): |  |  |  |  |  |  |  |  |
| 15 | 9.0 | .5 | 9.0 | 1.0 | 7.0 | 7.0 | 7.0 | 7.0 |
| 30 | 9.0 | .7 | 8.9 | 1.7 | 0 |  |  |  |
| 45 | 8.9 | .9 | 8.8 | 2.2 |  |  |  |  |
| 60 | 8.8 | 1.1 | 8.5 | 3.0 |  |  |  |  |
| 120 | 8.7 | 2.6 | 8.0 | 5.2 |  |  |  |  |
| 180 | 8.5 | 4.0 | 7.5 | 6.5 |  |  |  |  |
| 240 | 8.5 | 5.0 | 7.2 | 6.9 |  |  |  |  |
| 270 | 8.5 | 5.3 | 7.1 | 0.9 |  |  |  |  |

EXAMPLE II

To closer simulate commercial agitation conditions, 55.6 grams of n-paraffin-olefin mixture described in Example I, 23.4 grams of commercial grade benzene and 200 grams of hydrogen fluoride containing 99.93 wt. percent HF and .07% H₂O were charged to a Turbomixer maintained at 1,800 r.p.m., 22° C. and 150 p.s.i.g. for 10 minutes. Two equal portions of the resultant emulsion were drawn, as Runs E and F, into two 270 cc. polyethylene bottles as used in Example I and the settling time determined. In Run F, 0.18 gram of water were added to the emulsion to provide a final water concentration in the HF of about 0.30 wt. percent; Run G was performed in the same manner except that there was 0.30 wt. percent water originally in the HF. The results obtained are presented in Table III.

TABLE III

|  | Run | | | | | |
|---|---|---|---|---|---|---|
|  | E | | F | | G | |
|  | H | A | H | A | H | A |
| Time (min.): |  |  |  |  |  |  |
| 1 | 10.0 | 0.0 | 8.7 | 4.5 | 8.5 | 4.5 |
| 2 | 10.0 | 0.0 | 8.3 | 5.7 | 7.7 | 5.9 |
| 3 | 10.0 | .8 | 7.7 | 6.5 | 7.2 | 6.8 |
| 4 | 10.0 | 1.4 | 7.3 | 6.9 | 7.0 | 7.0 |
| 5 | 10.0 | 1.8 | 7.0 | 7.0 |  |  |
| 10 | 9.7 | 3.1 |  |  |  |  |
| 20 | 9.7 | 3.9 |  |  |  |  |
| 30 | 9.7 | 4.3 |  |  |  |  |

As is readily apparent from the foregoing data, the presence of a small amount of water is necessary to avoid the formation of a stable emulsion in a hydrogen fluoride catalyzed reaction. As shown in Tables II and III, increasing the water concentration from 0.07 wt. percent to about 0.30% eliminated the formation of a stable emulsion. This is particularly beneficial in a commerical process since, as shown in Table II, HF containing 0.07% water formed an emulsion, stable after 30 minutes of settling time. By utilizing HF containing 0.30% water the emulsion settled within 5 minutes, thus greatly lowering the residence time required to separate emulsions formed by utilizing essentially anhydrous HF. Also, as is apparent from Run F, the water need not be initially present in the HF but may be added to an already formed stable emulsion to break and settle it.

I claim as my invention:

1. A process for alkylating benzene with an alkylating agent comprising a mixture of a $C_{10}$–$C_{16}$ linear mono-olefin and a $C_9$–$C_{18}$ n-paraffin which comprises reacting said benzene in an alkylation zone maintained under alkylating conditions, with said alkylating agent in admixture with hydrogen fluoride catalyst containing about 0.2% to about 3.0% water by weight to form an unstable emulsion of catalyst, reactants, and reaction products; recovering said unstable emulsion from said alkylation zone; and separating said emulsion into an essentially acid-free hydrocarbon phase and an essentially hydrocarbon-free acid phase in a settling zone maintained at a holding time of less than about one hour.

2. A process for producing an alkyl-aromatic containing a $C_9$–$C_{18}$ linear alkyl group which comprises the steps of:
 (a) contacting a $C_9$–$C_{18}$ linear paraffin in a dehydrogenation zone with a dehydrogenation catalyst at dehydrogenation conditions to form a $C_9$–$C_{18}$ monoolefin, recovering therefrom said mono-olefin in admixture with unreacted n-paraffin;
 (b) alkylating, in an alkylation reactor, said monoolefin in admixture with said unreacted n-paraffin with a monocyclic aromatic in admixture with hydrogen fluoride catalyst containing about 0.2% to about 3.0% water by weight to form an alkylbenzene containing a $C_9$–$C_{18}$ linear alkyl group;
 (c) recovering, from said alkylation reactor, an unstable hydrocarbon-acid emulsion;
 (d) separating, said emulsion into an essentially acid-free hydrocarbon phase and an essentially hydrocarbon-free acid phase in a settling zone maintained at a holding time of less than about one hour; and,
 (e) separating from said hydrocarbon phase unalkylated monocyclic aromatic, $C_9$–$C_{18}$ n-paraffins and alkylaromatic product.

3. The process of claim 2 further characterized in that said monocyclic aromatic is benzene.

4. A method for separating a stable emulsion formed during the alkylation of a monocyclic aromatic with an alkylating agent comprising a mixture of a $C_9$–$C_{18}$ monoolefin and a $C_9$–$C_{18}$ n-paraffin in admixture with hydrogen fluoride catalyst which comprises adding water to provide from about 0.2% to about 3.0% by weight water based on the total hydrogen fluoride in said emulsion.

5. The method of claim 4 further characterized in that said aromatic is benzene.

References Cited

UNITED STATES PATENTS

| | | | |
|---|---|---|---|
| 3,246,047 | 4/1966 | Chapman et al. | 260—683.48 |
| 3,275,702 | 9/1966 | Huston | 260—671 |
| 3,238,249 | 3/1966 | Miruiss et al. | 260—671 XR |
| 3,303,233 | 2/1967 | Jones | 260—671 XR |

PAUL M. COUGHLAN, JR., Primary Examiner

C. R. DAVIS, Assistant Examiner

U.S. Cl. X.R.

252—328; 260—683.48